(12) United States Patent
Andressen et al.

(10) Patent No.: US 8,274,027 B2
(45) Date of Patent: Sep. 25, 2012

(54) TRANSPARENT SILICON DETECTOR AND MULTIMODE SEEKER USING THE DETECTOR

(75) Inventors: Clarence C. Andressen, Tucson, AZ (US); Robert C. Anderson, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 306 days.

(21) Appl. No.: 12/698,959

(22) Filed: Feb. 2, 2010

(65) Prior Publication Data
US 2012/0074295 A1   Mar. 29, 2012

(51) Int. Cl.
*G01J 1/42*   (2006.01)
*G01C 21/00*  (2006.01)

(52) U.S. Cl. ............. 250/203.1; 250/338.1; 250/339.01; 250/339.05; 342/53; 342/54; 342/62; 244/3.15

(58) Field of Classification Search ............... 250/338.1, 250/338.4, 339.01, 339.02, 339.05, 203.1–203.6; 342/53, 54, 62; 244/3.15–3.17; 359/581
See application file for complete search history.

(56) References Cited

U.S. PATENT DOCUMENTS

| | | | |
|---|---|---|---|
| 4,713,544 A | 12/1987 | Grage | |
| 5,371,361 A | 12/1994 | Arends et al. | |
| 5,432,374 A | 7/1995 | Norton et al. | |
| 5,532,871 A | 7/1996 | Hashimoto | |
| 5,557,466 A | 9/1996 | Otani | |
| 5,737,120 A | 4/1998 | Arriola | |
| 5,808,350 A | 9/1998 | Jack et al. | |
| 6,111,241 A | 8/2000 | English et al. | |
| 6,262,800 B1 | 7/2001 | Minor | |
| 6,396,626 B1 | 5/2002 | Otani | |
| 6,567,211 B1 | 5/2003 | Dolezal | |
| 6,606,066 B1 | 8/2003 | Fawcett | |
| 6,819,498 B1 | 11/2004 | Watanabe | |
| 6,924,772 B2 | 8/2005 | Kiernan | |
| 7,183,966 B1 | 2/2007 | Schramek et al. | |
| 7,336,345 B2 | 2/2008 | Krasutsky | |
| 7,629,582 B2 | 12/2009 | Hoffman et al. | |
| 7,786,418 B2 * | 8/2010 | Taylor et al. | ......... 244/3.16 |
| 2006/0261273 A1 | 11/2006 | Essex | |
| 2007/0170359 A1 | 7/2007 | Syllaios et al. | |

FOREIGN PATENT DOCUMENTS

WO   WO 2005022900   3/2005
WO   WO 2006073875   7/2006

OTHER PUBLICATIONS

World Intellectual Property Organization, International Search Report and Written Opinion for International Application No. PCT/US2010/059476, mail date Nov. 9, 2011, pp. 1-9.
Tydex, Anti-reflection Coatings, http://www.tydex.ru/en/materials1/coatings/aircoatings, Copyright 1994, 7 pages.

* cited by examiner

*Primary Examiner* — Kevin Pyo
(74) *Attorney, Agent, or Firm* — Lando & Anastasi, LLP

(57) ABSTRACT

A laser energy detector may include at least one photodetector device formed on a semiconductor substrate. The photodetector device may have an active area effective to detect laser energy at a laser wavelength. The active area of the laser energy detector may be substantially transparent for a first wavelength band within an infrared portion of the electromagnetic spectrum.

19 Claims, 9 Drawing Sheets

Section A-A

| | Layer | Material | Approximate Optical Thickness at 1.06μ | Approximate Optical Thickness at 10μ | |
|---|---|---|---|---|---|
| First coupling structure | 1 | high n | | 0.25 | |
| | 2 | low n | | 0.25 | |
| Quarter-wave stack | 3 - | high n | 0.25 | | 23 alternating layers |
| | 25 | low n | 0.25 | | |
| Second coupling structure | 26 | high n | 0.75 | | |
| | 27 | high n | | 0.25 | |
| | 28 | low n | | 0.25 | |

FIG. 8

TRANSPARENT SILICON DETECTOR AND MULTIMODE SEEKER USING THE DETECTOR

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to multimode seeker systems for projectiles, missiles, and other ordinance that, in at least one mode, engage targets by detecting and following laser light reflected from the targets.

2. Description of the Related Art

Ordinance such as guided artillery projectiles, guided missiles, and guided bombs, all of which will be referred to herein as "projectiles", may include a variety of imaging or non-imagining sensors to detect and track potential targets. Sensors used to guide projectiles to an intended target are commonly referred to as seekers. Seekers may operate in various portions of the electromagnetic spectrum, including the visible, infrared (IR), microwave, and millimeter wave (MMW) portions of the spectrum. Some projectiles may incorporate multiple sensors that operate in more than one portion of the spectrum. A seeker that incorporates multiple sensors that share a common aperture and/or common optical system is commonly called a multimode seeker.

One type of seeker used in projectiles is a semi-active laser (SAL) seeker to detect laser radiation reflected from an intended target and to provide signals indicative of the target bearing such that the projectile can be guided to the target. The SAL may include an optical system to capture and focus the reflected laser radiation and a detector. In order to provide high sensitivity, the SAL optical system may have a large aperture and high optical efficiency.

In order to guide a projectile to a target when laser illumination of the target is not available, the projectile may be equipped with a dual-mode seeker including a SAL seeker and an imaging infrared (IIR) seeker. The projectile may be equipped with a tri-mode seeker including a SAL seeker, an IIR seeker, and a millimeter-wave radar seeker.

DESCRIPTION OF THE DRAWINGS

FIG. 8 is a table summarizing the structure of an exemplary back surface coating.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
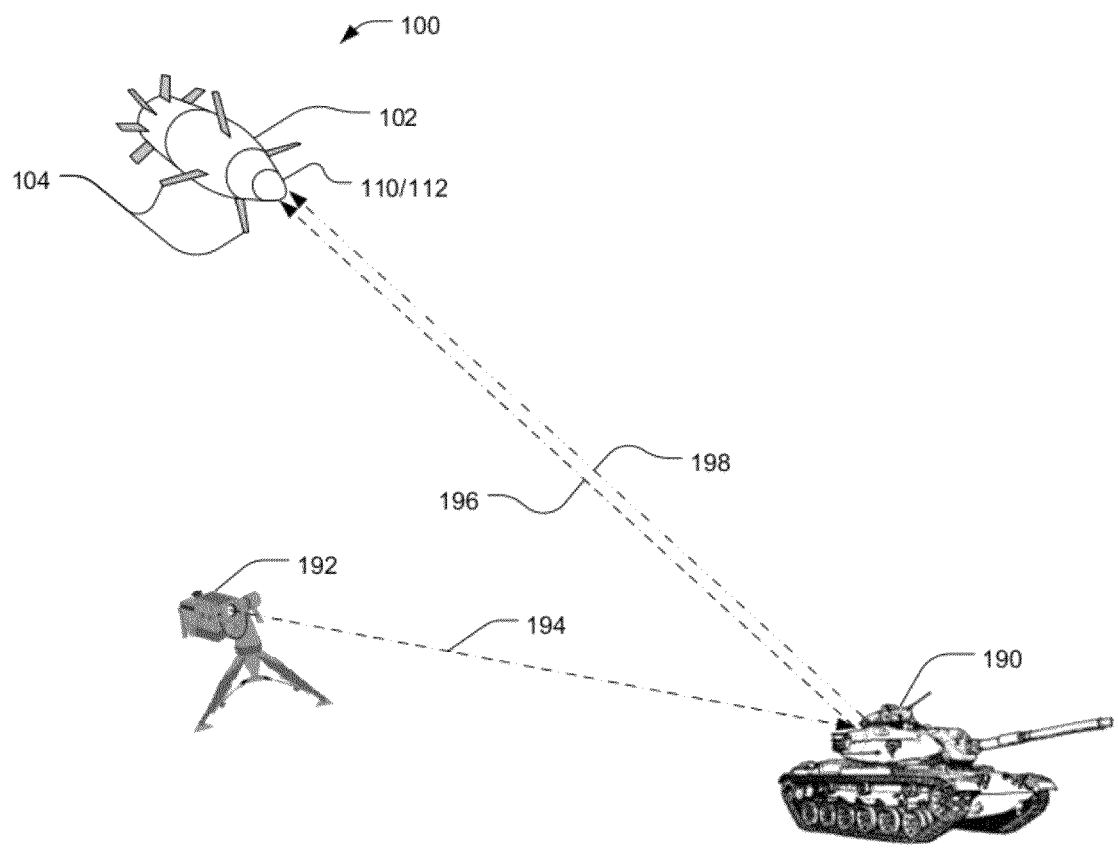
FIG. 1 is a schematic illustration of a laser guided projectile engaging a target.

Referring now to FIG. 1, a projectile 100 may include a projectile body 102, control surfaces 104, and a guidance system (not shown). The guidance system may include a seeker system 110, of which only a transmissive dome 112 is visible in FIG. 1. The guidance system may include a flight control system (not shown) to control the flight of the projectile 100 by manipulating one or more control surfaces 104 based on at least one guidance signal from the multimode seeker. In the example of FIG. 1, the control surfaces 104 are shown as canards, but may be fins, wings, ailerons, elevators, spoilers, flaps, air brakes or other controllable devices capable of affecting the flight path of the projectile 100.

The seeker system 110 may include a SAL seeker to allow the projectile 100 to engage a target 190 by detecting and following reflected laser radiation 196 from the target 190. In FIG. 1, the target 190 is represented as a tank, but may be another type of vehicle or a structure, building or other stationary object. The target 190 may be illuminated with laser radiation 194 from a laser designator 192. The laser designator 192 may be located on the ground, as shown in FIG. 1, or may be located in a vehicle or aircraft. The reflected laser radiation 196 may be a portion of the illumination laser radiation 194.

The seeker system 110 may also include an IIR seeker receptive to infrared radiation 198 radiated from the target 190 and the surrounding scene. When a laser designator 192 is not available to illuminate the target 190, the projectile 100 may be guided to the target using guidance signals from the IIR seeker.

Figure 2:
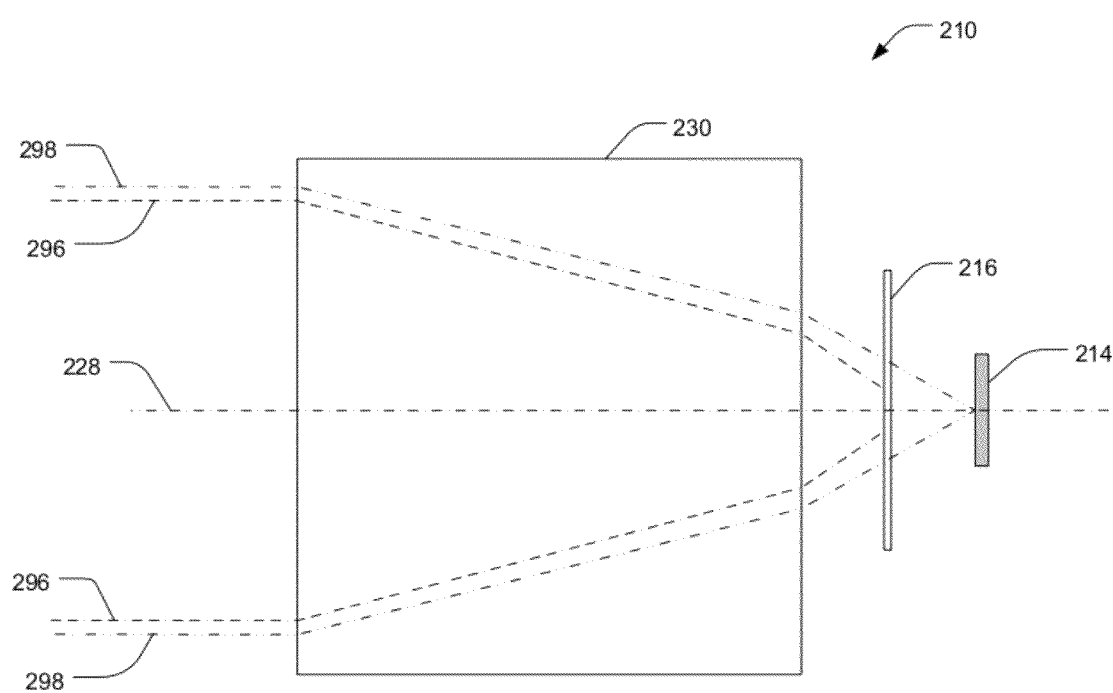
FIG. 2 is a block diagram of a multi-mode seeker.

Referring now to FIG. 2, a multimode seeker 210 may include an infrared focal plane array detector 214, a laser energy detector 216, and an imaging optical system 230. The imaging optical system 230 and the laser energy detector 216 may collectively form a SAL seeker. Laser energy reflected from a target may be softly focused by the imaging optical system upon the laser energy detector 216. Specifically, laser energy reflected from a point in the scene may form an extended spot having at least a predetermined diameter at the laser energy detector 216. Rays 296, shown as dash-dash-dot lines, are examples of laser rays forming an extended spot at the laser energy detector 216. Commonly, SAL seekers detect laser energy having a wavelength of 1.06 microns. Other laser wavelengths may be used.

The laser energy detector 216 may convert incident laser energy into electrical signals indicative of an angular bearing to a designated target. For example, the laser energy detector 216 may be a quadrant detector that provides four electrical signals indicative of the amount of laser energy incident on each of four quadrants of the detector. The bearing to the designated target may then be determined from the relative strength of each of the four signals.

The imaging optical system 230 and the infrared focal plane array 214 may collectively form an IIR seeker. Infrared radiation from a scene may be focused by the imaging optical system 230 to form an image of the scene upon the focal plane array detector 214. Rays 298, shown as dash-dot-dot lines, are examples of IR rays imaged onto the focal plane array detector 214.

The focal plane array detector 214 may convert incident IR radiation into electrical signals that may be analyzed by a signal processor (not shown) to detect and track targets. The focal plane array may be sensitive to IR radiation within a selected portion of the IR spectrum, such as radiation having a wavelength of 1.1-2.0 microns, 1.5-2.5 microns, 3-5 microns, 8-12 microns, or some other portion of the infrared spectrum.

The laser energy detector 216 may be disposed along the optical path of the IIR seeker such that infrared radiation, such as rays 298, must pass through the laser energy detector to reach the infrared focal plane array detector 214. In the example of FIG. 2, the laser energy detector 216 is positioned along the optical axis 228 between the imaging optical system and the infrared focal plane array detector 214. The laser energy detector 216 may be positioned within the imaging optical system. In either case, the laser energy detector must be substantially transparent for the selected portion of the IR spectrum used by the IIR seeker. In this context, "substantially transparent" means that a large portion of energy with the selected portion of the IR spectrum is transmitted through the laser energy detector. A laser energy detector may be considered as "substantially transparent" if the portion of infrared energy transmitted through the laser energy detector is sufficient to allow the IIR seeker to meet predetermined performance requirements.

Figure 3:
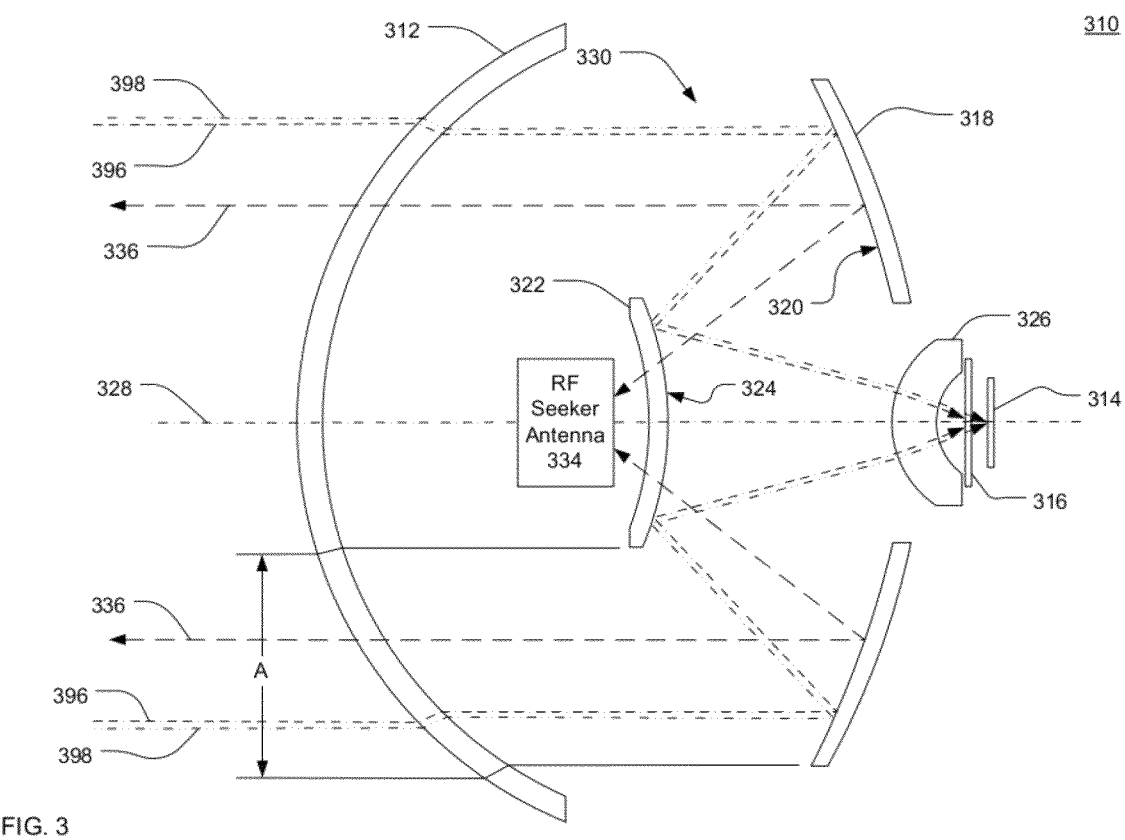
FIG. 3 is a schematic cross-sectional view of a multi-mode seeker with a catadioptric optical system.

Referring now to FIG. 3, an exemplary multimode seeker 310 may include at least a SAL seeker and an IIR seeker. The multimode seeker 310 may include an infrared focal plane array detector 314, a laser energy detector 316, and a catadioptric (containing both reflective and refractive optical elements) imaging optical system 330. The imaging optical system 330 may include a transparent dome 312, a primary mirror 318, a secondary mirror 322, and a lens 326. The imaging optical system 330 is exemplary and an imaging optical system may include other combinations and arrangements of reflective and refractive optical elements. FIG. 3 does not show any of the structure required to support and position the functional elements. Many of the elements shown in cross-section in FIG. 3 may be rotationally symmetric about an optical axis 328. The dome 312, the primary minor 318, the secondary minor 322, and the lens 326 may all be three-dimensional objects whose figures may be defined by rotating the corresponding cross-sectional shapes 180 degrees about the optical axis 328.

The IIR seeker may include the infrared focal plane array detector 314 and the imaging optical system 330. Infrared radiation from a scene may pass through the dome 312, reflect from a surface 320 of the primary mirror 318, reflect again from a surface 324 of the secondary mirror 322, pass through the field lens 326, and form an image of the scene upon the focal plane array detector 314. Rays 398, shown as dash-dot-dot lines, are examples of IR rays imaged onto the focal plane array detector 314.

The imaging optical system 330 may have an aperture A in the form of an annular ring approximately defined, at least for rays parallel to the axis 328, by the outside diameter of the primary mirror 318 and the outside diameter of the secondary mirror 324.

The laser energy detector 316 may be disposed along the optical path of the IIR seeker such that infrared radiation, for example rays 398, must pass through the laser energy detector to reach the infrared focal plane array detector 314. In the example of FIG. 3, the laser energy detector 316 is positioned along the optical axis 328 between the field lens 326 and the infrared focal plane array detector 314. Thus the laser energy detector 316 must be substantially transparent for a selected portion of the IR spectrum used by the IIR seeker.

Figure 4:
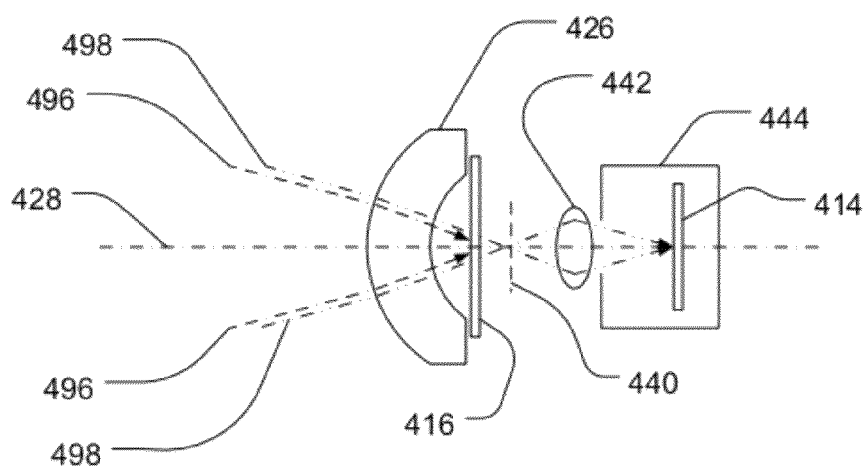
FIG. 4 is a partial schematic cross-sectional view of another multi-mode seeker with a catadioptric optical system.

Referring now to FIG. 4, an IIR seeker may include a re-imaging optical system 442. In this case, infrared rays 496 passing through the field lens 426 may form an intermediate image at an image plane 440. The re-imaging optical system 442, which may include one or more optical elements, may then form a second image at a focal plane array 414 disposed further to the right (as shown in FIGS. 3 and 4) along the common optical axis 428. The focal plane array 414 may be disposed within a thermally-insulating enclosure 444, such that the focal plane array 414 may be cooled below ambient temperature.

Referring back to FIG. 3, the SAL seeker may include the laser energy detector 316 and a semi-imaging optical system including the dome 312, the primary mirror 318, the secondary mirror 322, and the field lens 326. Laser energy reflected from a target may pass through the dome 312, reflect from the surface 320 of the primary mirror 318, reflect again from the surface 324 of the secondary mirror 322, pass through the field lens 326, and be softly focused upon the transparent detector 316. Rays 396, shown as dash-dash-dot lines, are examples of laser rays forming a defused spot at the laser energy detector 316. The optical aperture of the SAL seeker may be the annular ring A, essentially the same as the aperture of the IIR seeker. In this context, "essentially the same" means the same except for a small difference that may be introduced by dispersion (variation of refractive index with wavelength) of the dome 312 and field lens 326.

The multimode seeker may optionally include a radio-frequency (RF) seeker having an antenna 334 located forward (toward the scene) of the secondary mirror 322. The RF seeker may operate in a selected portion of the microwave, millimeter-wave, sub-millimeter-wave, or terahertz potions of the radio frequency spectrum. The RF seeker may operate, for example, in a portion of the Ka band (26.5-40.0 GHz), the V band (40-75 GHz), the W band (75-111 GHz), or another portion of the radio frequency spectrum. The antenna 334 may be a single antenna element or a plurality or array of antenna elements. RF energy returning from the outside scene may reflect from the primary mirror 318, transmit through the secondary mirror 322, and impinge upon the antenna 334. The reflective optical power of the primary mirror 318 and the refractive optical power of the secondary mirror 322 may act in combination to collimate RF energy transmitted from the antenna 334 and to focus energy received from the outside scene onto the antenna 334. Rays 336, shown as dashed lines, are examples of RF rays focused onto the antenna 334.

The dome 312 may function to shield the components of the multimode seeker from the outside environment and from the air stream when the multimode seeker is in flight. The dome 312 may be essentially spherical as shown in FIG. 3, or may be conical, flat, or some other shape. The shape of the dome 312 may be selected for a combination of optical and aerodynamic properties.

The dome 312 and the lens 326 may be made of a material that is substantially transparent at the wavelength of operation of the SAL seeker and the wavelength band of operation of the IIR seeker. For example, the SAL seeker may operate at a wavelength of 1.06 microns and the IIR seeker may operate from 1.1-2.0 microns, 1.5-2.5 microns, 3-5 microns, 8-12 microns, or some other portion of the infrared spectrum. When the IIR seeker operates from 8-12 microns, the dome 312 and the lens 326 may be fabricated from ZnSe, ZnS, AMTIR-1 glass, or other material that is substantially transparent from 1 to 12 microns. When the IIR seeker operates at a shorter wavelength, the dome 312 and the lens 326 may be fabricated from ZnSe, ZnS, AMTIR-1 glass, Sapphire or Aluminum Oxynitride (substantially transparent to about 4.5 microns), fused silica (substantially transparent to about 3.5 microns), or other materials. The surfaces of the dome 312 and the lens 326 may support antireflection coatings.

The reflective surfaces 320 and 324 of the primary mirror 318 and the secondary mirror 322 may be coated with a reflective coating such as, for example, aluminum, gold, silver, or a multilayer dielectric coating. Mirrors with metallic reflective coating may typically receive a protective overcoat of a dielectric material. When the RF seeker antenna 334 is present, the coating on the surface 324 of the secondary mirror 322 may be a multilayer dielectric coating to provide transparency for the RF radiation emitted and/or received by the RF seeker antenna 334.

One or more of the surface 320, the surface 324, or the front and back surfaces of the lens 326 may support a surface feature such as a diffractive optical element, a binary optical element, or a microprism diffuser. A surface feature may be used, for example, to provide color correction over the operating wavelength band of the IIR seeker, or to control the laser energy spot size on the laser detector 316.

Figure 5:
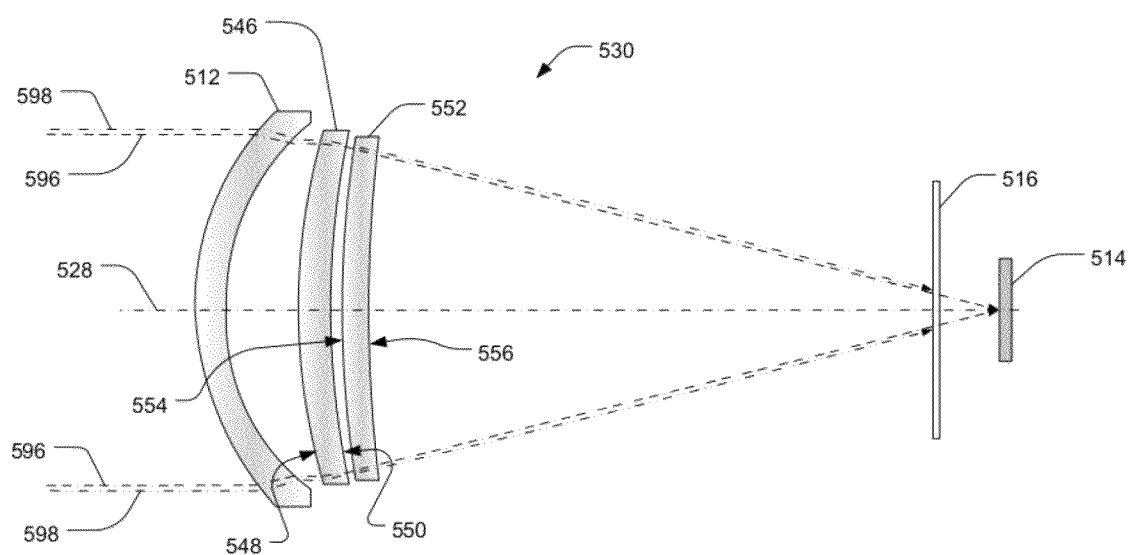
FIG. 5 is a schematic cross-sectional view of a dual-mode seeker with a refractive optical system.

Referring now to FIG. 5, a dual mode IIR/SAL seeker may include an infrared focal plane array detector 514, a laser energy detector 516, and an imaging optical system 530 that, in this example, includes a transparent dome 512, a first lens 546, and a second lens 552. Depending on the required wavelength band, field or view, and other parameters, an imaging optical system for a multimode seeker may have more or fewer than two lenses. FIG. 5 does not show any of the structure required to support and position the functional elements. The dome 512, the first lens 546, and the second lens 552 are shown in cross-section in FIG. 5 and may be rotationally symmetric about an optical axis 528.

Infrared radiation from a scene may pass through the dome 512 and may be focuses to form an image of the scene upon the focal plane array detector 514 by the collective effect of the first lens 546 and the second lens 552. Rays 598, shown as dash-dot-dot lines, are examples of IR rays imaged onto the focal plane array detector 514.

Laser energy reflected from a target may pass through the dome 512 and be softly focused upon the transparent detector 516 by the collective effect of the first lens 546 and the second lens 552. Rays 596, shown as dash-dash-dot lines, are examples of laser rays forming a defused spot at the laser energy detector 516. The optical aperture of the SAL seeker and the IIR seeker may be essentially the same.

The dome 512, the first lens 546, and the second lens 552 may be made of materials that are substantially transparent at the wave length of operation of the SAL seeker and the wavelength band of operation of the IIR seeker. Each of the surfaces 548 and 550 of the first lens 546 and the surfaces 554 and 556 of the second lens 552 may be spherical or aspheric. One or more of the surfaces 548, 550, 554, 556 may support a surface feature such as a diffractive optical element or binary optical element. A surface feature may be used, for example, to provide color correction over the operating wavelength band of the IIR seeker, or to control the laser energy spot size on the laser detector 516.

Figure 6A:
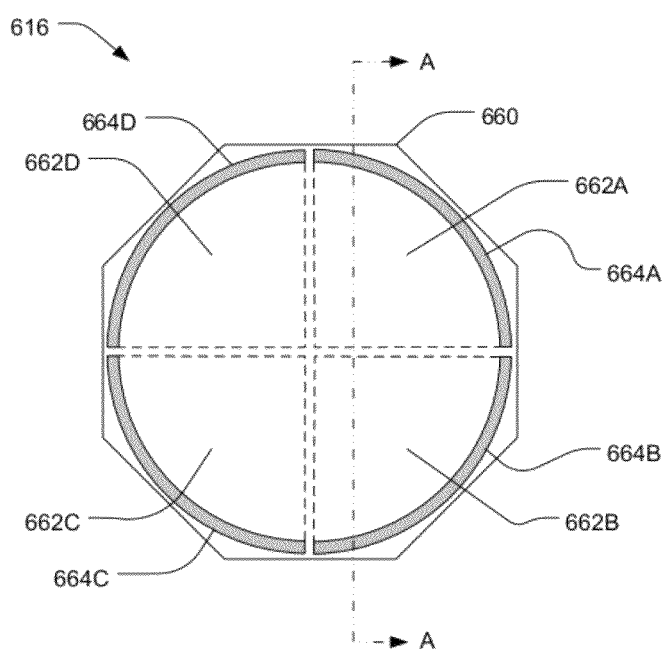
FIG. 6A is a schematic frontal view of a transparent silicon detector.
Figure 6B:
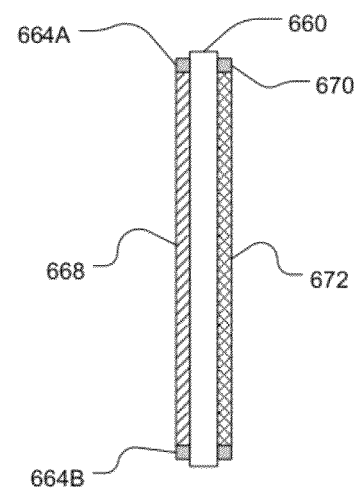
FIG. 6B is schematic cross-sectional view of the transparent silicon detector of FIG. 6A.

Referring now to FIG. 6A and FIG. 6B, a laser energy detector 616, which may be suitable for use as the laser energy detectors 216, 316, 416, 516, may include a semiconductor substrate 660 on which at least one photodetector device is formed. The at least one photodetector device may be four photodetector devices 662A, 662B, 662C, 662D configured to detect laser radiation incident on four respective quadrants of the semiconductor substrate 660. The photodetector devices 662A-D may each include a respective active area effective to detect laser radiation at a specific predetermined wavelength. For example, the laser wavelength may be 1.06 microns. When the laser wavelength is 1.06 microns, the semiconductor substrate 660 may be silicon and the photodector devices 662A-D may be junction photodiodes, pin photodiodes, avalanche photodiodes, or other photodetector devices.

Four electrodes 664A, 664B, 664C, 664D may be formed on a first side of the semiconductor substrate 660 to make electrical contact to respective photodetector devices 662A-D. A single electrode 670 may be formed on a second side of the semiconductor 660 to make a common electrical contact to the photodetector devices 662A-D. The electrodes 664A-D and 670 shown in FIG. 6A and FIG. 6B are annual conductors formed on the semiconductor substrate 660. The circular area within the annular electrodes may define the active areas of photodetector devices 662A-D. Other electrode shapes, including grids of fine conductors or transparent conductive films extending over all or portions of the clear aperture, may be used instead of, or in addition to, the annular electrodes 664A-D and 670 shown in FIG. 6A and FIG. 6B.

A laser energy detector for use in the multimode seeker systems 210, 310, and 510 must be highly transparent in the portion of the infrared spectrum used by the respective IIR seeker. However, the semiconductor substrate 660 may have a high refractive index at infrared wavelengths. Thus, even if the semiconductor substrate is non-absorbing for the portion of the infrared spectrum used by the respective IIR seeker, a significant amount of infrared radiation may be reflected at the surfaces of the semiconductor substrate 660. For example, silicon has a refractive index of about 3.4 in the infrared spectrum. Thus a total of about 50% of incident infrared radiation may reflect at the front and back surfaces of an uncoated silicon substrate.

To reduce the portion of incident infrared radiation reflected at the surfaces of the semiconductor substrate, coatings 668 and 672 may be deposited onto the surfaces. The coatings 668 and 672 may be antireflective for the infrared wavelength band. In this patent, an "antireflective coating" is a coating that reduces the reflectivity of an optical surface to a value below the reflectivity of the surface without the coating. An ideal antireflective coating may reduce the reflection from a surface to near zero for a predetermined wavelength band and angle of incidence. Similarly, a "reflective coating" is a coating that increases the reflectivity of an optical surface to a value above the reflectivity of the surface without the coating. An ideal reflective coating may increase the reflection from a surface to nearly 100 percent for a predetermined wavelength band and angle of incidence.

To provide high detection efficiency for incident laser radiation, the multilayer dielectric coating on the front surface (the surface facing the incident laser and infrared radiation) of the laser energy detector 616 may also be antireflective at the laser wavelength. Conversely, the multilayer dielectric coating on the back surface (the surface facing the infrared focal plane array detector) of the laser energy detector 616 may be reflective at the laser wavelength, such that incident laser energy transmitted through the laser energy detector 616 is directed back through the laser energy detector 616.

Thus the coating on the front side of the laser energy detector 616, which may be either coating 668 or coating 672, may be configured to be antireflective for both the laser wavelength and the portion of the infrared spectrum used by the IIR seeker. The coating on the back side of the laser detector 614, which may be either coating 668 or coating 672, may be antireflective for the portion of the infrared spectrum used by the IIR seeker and to be highly reflective at the laser wavelength. The coatings 668 and 672 may each cover the active areas of photodetector devices 662A-D.

Both antireflective and reflective coatings may be implemented by depositing one or more layers of dielectric materials onto the surface of a substrate or optical element. In a dielectric coating, some incident light reflects at each interface between the substrate and a first coating layer, between adjacent coating layers, and between a last coating layer and the ambient air. The amplitude and relative phase of the reflection at each interface is determined by the refractive index and thickness of the coating layers. For an antireflective coating, the number of coating layers and the refractive index and thickness of each layer may be selected such that the vector sum of the reflections at the various interfaces is near zero. For a reflective coating, the number of coating layers and the refractive index and thickness of each layer may be selected such that the vector sum of the reflections at the various interfaces approaches 100%. Both antireflective coatings and reflective coatings may be designed, characterized, and optimized using commercially available software tools including FILMSTAR™ from FTG Software Associates, OPTILAYER™ from Optilayer Ltd., FILM WIZARD™ from Scientific Computing International, and other software tools.

A well-known form of antireflection coating is a single layer of dielectric material deposited upon a substrate. Ideally, the refractive index of the dielectric layer should be equal to the square root of the refractive index of the substrate, and the optical thickness (physical thickness multiplied by refractive index) of the dielectric layer should be one-fourth of a design wavelength at a specific design angle of incidence. In this case, a reflection from the substrate-coating interface and a reflection from the coating-air interface may cancel precisely at the design wavelength and angle. An ideal single-layer antireflection coating may reduce the reflectivity of a surface to zero at the design wavelength and incidence angle, and may substantially reduce the reflectivity of the surface over a broad range of wavelengths and incidence angles centered on the design wavelength and angle.

Figure 7A:
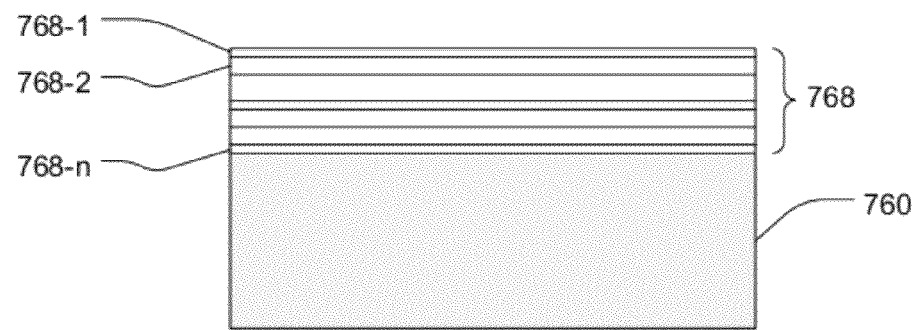
FIG. 7A is a schematic cross-sectional view of a front surface coating.

Referring now to FIG. 7A, an antireflection coating 768 for the front side of a laser energy detector, such as the laser energy detectors 216, 316, 416, 516, may provide low reflectivity for both a laser wavelength and for an infrared wavelength band significantly longer than the laser wavelength. The antireflection coating 768 may include a plurality of layers 768-1 to 768-n. The layers may be formed from two or more materials having different refractive indices. The two or more materials may be essentially transparent at the laser wavelength and the infrared wavelength band. The two or more material may be mutually compatible and suitable for deposition in thin films by a process such as evaporation, chemical vapor deposition, or sputtering.

When the laser wavelength is 1.06 microns and the infrared wavelength band is 8.0 microns to 12.0 microns, suitable materials for the coatings layers 768-1 to 768-n may be Cerium Fluoride (CeF3) and Ytterbium Fluoride (YbF3) which have relatively low refractive indices and Zinc Sulfide (ZnS) and Zinc Selenide (ZnSe), which have relatively high refractive indices. The refractive index of each material and each coating layer will vary with respect to wavelength and may vary, to a small extent, depending on the process used to deposit the coating layers. Any coating design may require iteration and optimization due to variations in coating processes.

The optical thickness of the layers 768-1 to 768-n may be smaller than the laser wavelength and thus much smaller than the wavelengths within the infrared wavelength band. In this case, for the purpose of designing an antireflection coating for the infrared wavelength band, the layers 768-1 to 768-n may essentially function as a uniform material having an optical thickness equal to the sum of the optical thicknesses of the layers 768-1 to 768-n and a refractive index equal to the weighted average refractive index of layers 768-1 to 768-n. To provide low reflectivity for the infrared wavelength band, the entire coating 768 may function as a single-layer antireflection coating for the infrared wavelength. For example, in the case of a silicon substrate and an infrared wavelength band from 8.0 microns to 12.0 microns, the materials and thicknesses of the coating layers 768-1 to 768-n may be selected to meet two criteria. First, the materials and thicknesses of the coating layers 768-1 to 768-n may be selected such that average refractive index of the coating 768 may be about 1.84. Second, the materials and thicknesses of the coating layers 768-1 to 768-n may be selected such that the total optical thickness of the coating 768 may be about one-quarter wavelength at the center of the infrared wavelength band, or about 2.5 microns.

To provide low reflectivity at the laser wavelength, the materials and thicknesses of the coating layers 768-1 to 768-n may be selected to meet a third criteria. The materials and thicknesses of the coating layers 768-1 to 768-n may be selected such that a vector sum of the reflections at the interfaces between the substrate 760, the coating layers 768-1 to 768-n, and the ambient air is nearly equal to zero. A suitable coating may be designed to meet the first, second, and third criterion using one of the commercially-available software tools. The number of different coating designs meeting the first, second and third criterion may be very large.

A well-known form of reflective coating is a so-called "quarter wave stack", which includes a plurality of alternating layers of a first dielectric material with a relatively low refractive index and a second dielectric material with a relatively high refractive index. Each of the coating layers may have an optical thickness of one-quarter of the wavelength to be reflected. The number of coating layers may be determined based on the difference in refractive index between the two materials and the required peak reflectivity and reflection bandwidth. In some cases, the thickness of some of the coating layers may deviate from one-quarter wavelength to suppress reflection sidebands or to control some other feature of the coating.

Figure 7B:
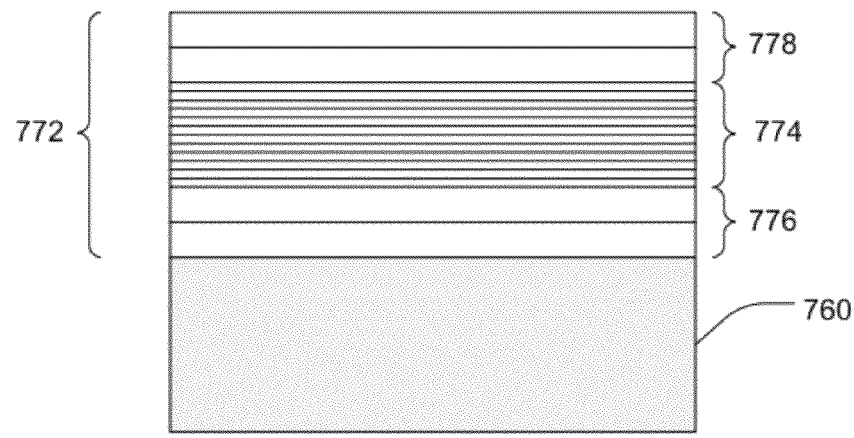
FIG. 7B is a schematic cross-sectional view of a back surface coating.

Referring now to FIG. 7B, a coating 772 for a back surface of a laser energy detector, such as the laser energy detectors 216, 316, 416, 516, may be highly reflective for a laser wavelength and antireflective for an infrared wavelength band longer than the laser wavelength. The coating 772 may include a quarter-wave stack 774, first coupling structure 776 disposed between the quarter-wave stack 774 and the substrate 760, and a second coupling structure 778 disposed between the quarter-wave stack 774 and the ambient air. The first coupling structure 776, the quarter-wave stack 774, and the second coupling structure 778 may each be composed of one or more dielectric layers deposited in succession onto the substrate 760.

The quarter-wave stack 774 may include a plurality of alternating layers of a low refractive index dielectric material and a high refractive index dielectric material. Each of the layers may have an optical thickness about one-quarter of the laser wavelength. The total number of layers may be selected to provide a desired reflectivity at the laser wavelength.

Since each layer may have an optical thickness much less than one-quarter wavelength for the infrared wavelength band, the quarter wave stack 774 may effectively function as a slab of uniform material for the infrared wavelength band. The slab may have an effective optical thickness approximately equal to the total optical thickness of the quarter-wave stack 774. The slab may have an effective refractive index approximately equal to the average refractive index of the two materials in the quarter-wave stack 774.

To provide low reflectivity at the infrared wavelength band, the materials and thicknesses of the first coupling structure 776 and the second coupling structure 778 may be selected such that a vector sum of the reflections at the interfaces within and between the substrate 760, first coupling structure 776, the quarter-wave stack 774, the second coupling structure 778, and the ambient air is nearly equal to zero. A suitable coating may be designed by, for example, first designing the reflective quarter-wave stack 774 and then designing the first and second coupling structures using one of the commercially-available software tools. A plurality of different coating designs which provide high reflectivity at the laser wavelength and low reflectivity for the infrared wave length band may be possible.

An exemplary back surface coating for a silicon laser radiation detector is summarized in FIG. 8. For this example, the laser wavelength is assumed to be 1.06 microns, and the infrared wavelength band is assumed to be 8.0 to 12.0 microns. The optical thickness of the coating layers is provided at a wavelength of either 1.06 microns or 10 microns. Note that the optical thickness of each layer will be different at each wavelength due to dispersion (change of refractive index with wavelength) of the coating materials. In a coating design optimized by a software tool, the nominal thickness of each layer may deviate from the thickness values listed in FIG. 8. The low index material (low n) may be a material, such as CeF3 or YbF3, having a refractive index less than about 1.6 for the laser wavelength and the infrared wavelength band. The high index material (high n) may be a material, such as ZnS or ZnSe, having a refractive index greater than about 2.0 for the laser wavelength and the infrared wavelength band.

Figure 9:
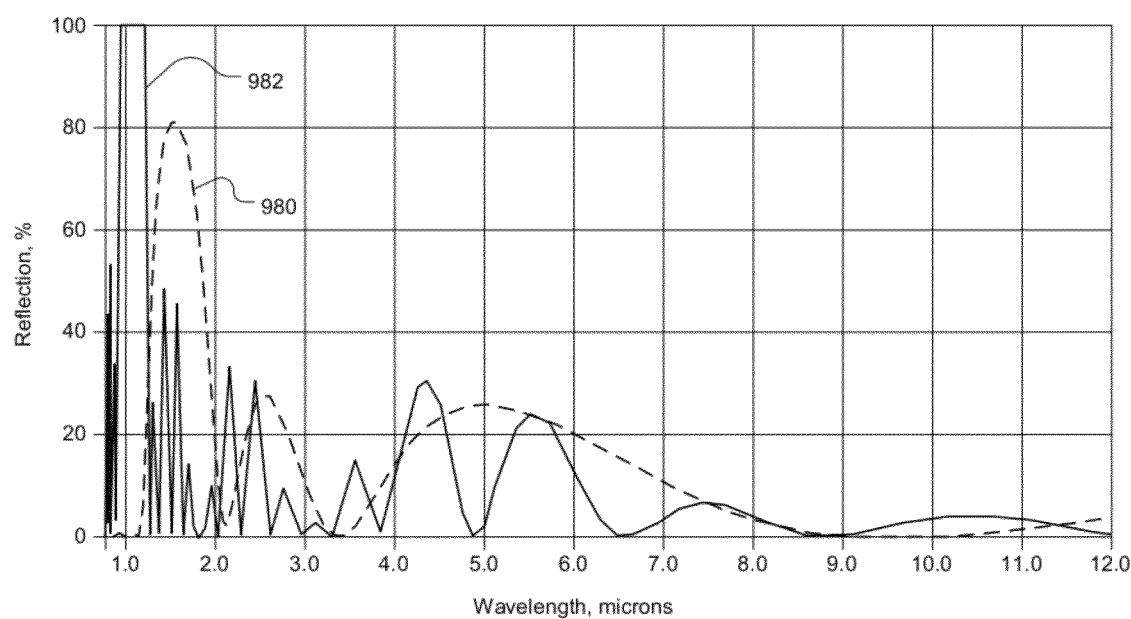
FIG. 9 is a graph showing modeled reflection characteristics of a coated transparent silicon detector.

FIG. 9 is a graph showing the hypothetical reflectivity, from computer modeling, of multilayer dielectric coatings for front and back sides of a laser detector such as the laser detector 614. These coatings are intended for a silicon laser detector to detect a laser wavelength of 1.06 microns, for use in conjunction with an IIR seeker operating from 8.0 to 12.0 microns. A dashed line 980 shows the reflectance of a coated front surface of a silicon laser detector over an infrared wavelength range from 1.0 to 12.0 microns. The reflectivity of the coated front surface is less than 1% at the laser wavelength and less than 2% average over the 8.0-12.0 micron spectrum used by the IIR seeker. 2% average reflectivity is substantially reduced compared to the 30% reflectivity of an uncoated silicon surface.

A solid line 982 shows the reflectance of a coated back surface of a silicon laser detector. The reflectivity of the coated back surface is more than 99% at the laser wavelength and less than 2% average over the 8.0-12.0 micron spectrum used by the IIR seeker.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A laser energy detector, comprising:
   a photodetector formed on a semiconductor substrate, the semiconductor substrate having a front side and an opposing back side, the photodetector including an active area effective to detect laser energy within a first wavelength band, wherein the active area of the photodetector is substantially transparent for a second wavelength band within an infrared portion of the electromagnetic spectrum; and
   a back-side coating disposed on the back side of the semiconductor substrate at least over the active area, wherein the back-side coating is reflective for the first wavelength band and antireflective for the second wavelength band, the back-side coating including a plurality of alternating layers of a low refractive index material and a high refractive index material, the low refractive index material being one of CeF3 and YbF3 and the high refractive index material being one of ZnS and ZnSe.

2. The laser energy detector of claim 1, further comprising:
   a front-side coating disposed on the front side of the semiconductor substrate at least over the active area, wherein the front-side coating is antireflective for the first wavelength band and antireflective for the second wavelength band.

3. The laser energy detector of claim 1, wherein the photodetector further comprises:
four quadrant photodetector devices disposed to detect laser radiation incident upon respective quadrants of the active area.

4. The laser energy detector of claim 1, wherein
the substrate is a silicon wafer, and
the first wavelength band includes 1.06 microns.

5. The laser energy detector of claim 4, wherein
the second wavelength band is within the portion of the infrared spectrum from 1.5 microns to 12 microns.

6. The laser energy detector of claim 5, wherein the second wavelength band is one of 1.5-2.5 microns, 3-5 microns and 8-12 microns.

7. A multimode seeker comprising:
a focal plane array detector to detect electromagnetic energy within a second wavelength band within an infrared portion of the electromagnetic spectrum; and
an imaging optical system that forms an image of a scene on the focal plane array detector; and
a laser energy detector disposed between the imaging optical system and the infrared focal plane array detector, the laser energy detector comprising:
at least one photodetector formed on a semiconductor substrate, the photodetector having an active area effective to detect laser energy within a first wavelength,
wherein the active area is substantially transparent for the second wavelength band.

8. The multimode seeker of claim 7, wherein the imaging optical system softly focuses laser energy from the scene onto the laser energy detector.

9. The multimode seeker of claim 8, wherein the imaging optical system focuses laser energy from a point in the scene to a spot, at the laser energy detector, having a spot size not less than a predetermined minimum value.

10. The multimode seeker of claim 9, wherein the imaging optical system includes at least one surface feature for controlling the spot size at the laser energy detector.

11. The multimode seeker of claim 7, wherein the imaging optical system includes at least one surface feature for color correction of the image at the focal plane array detector.

12. The multimode seeker of claim 7, wherein the semiconductor substrate has a front side and an opposing back side, the laser energy detector further comprising:
a back-side coating disposed on the back side of the semiconductor substrate at least over the active area, wherein the back-side coating is reflective for the first wavelength band and antireflective for the second wavelength band, the back-side coating including a plurality of alternating layers of a low refractive index material and a high refractive index material, the low refractive index material being one of CeF3 and YbF3 and the high refractive index material being one of ZnS and ZnSe.

13. An integrated semi-active laser (SAL) seeker and imaging infrared (IIR) seeker, comprising:
an optical system that defines essentially the same optical aperture for the SAL seeker and the IIR seeker;
a infrared focal plane array detector to detect electromagnetic energy within an predetermined wavelength band, the infrared focal plane array detector disposed at an image plane of the optical system; and
a laser energy detector disposed along an optical path between the imaging optical system and the infrared focal plane array detector,
wherein an active area of the laser energy detector is substantially transparent for the predetermined wavelength band.

14. The integrated semi-active laser (SAL) seeker and imaging infrared (IIR) seeker of claim 13, wherein the optical system forms an image of a scene on the focal plane array detector.

15. The integrated semi-active laser (SAL) seeker and imaging infrared (IIR) seeker of claim 14, wherein the optical system softly focuses laser energy from the scene onto the laser energy detector.

16. The integrated semi-active laser (SAL) seeker and imaging infrared (IIR) seeker of claim 15, wherein the optical system focuses laser energy from a point in the scene to a spot, at the laser energy detector, having a spot size not less than a predetermined minimum value.

17. The integrated semi-active laser (SAL) seeker and imaging infrared (IIR) seeker of claim 16, wherein the optical system includes at least one surface feature for controlling the spot size at the laser energy detector.

18. The integrated semi-active laser (SAL) seeker and imaging infrared (IIR) seeker of claim 14, wherein the imaging optical system includes at least one surface feature for color correction of the image at the focal plane array detector.

19. The integrated semi-active laser (SAL) seeker and imaging infrared (IIR) seeker of claim 13, wherein the laser energy detector includes a back-side coating disposed on a back side of the active area, the back-side coating being antireflective for the predetermined wavelength band and including a plurality of alternating layers of a low refractive index material and a high refractive index material, the low refractive index material being one of CeF3 and YbF3 and the high refractive index material being one of ZnS and ZnSe.

* * * * *